July 12, 1955 C. R. GILBERTSON 2,712,840
VENEER WORKING MACHINE
Filed March 29, 1954
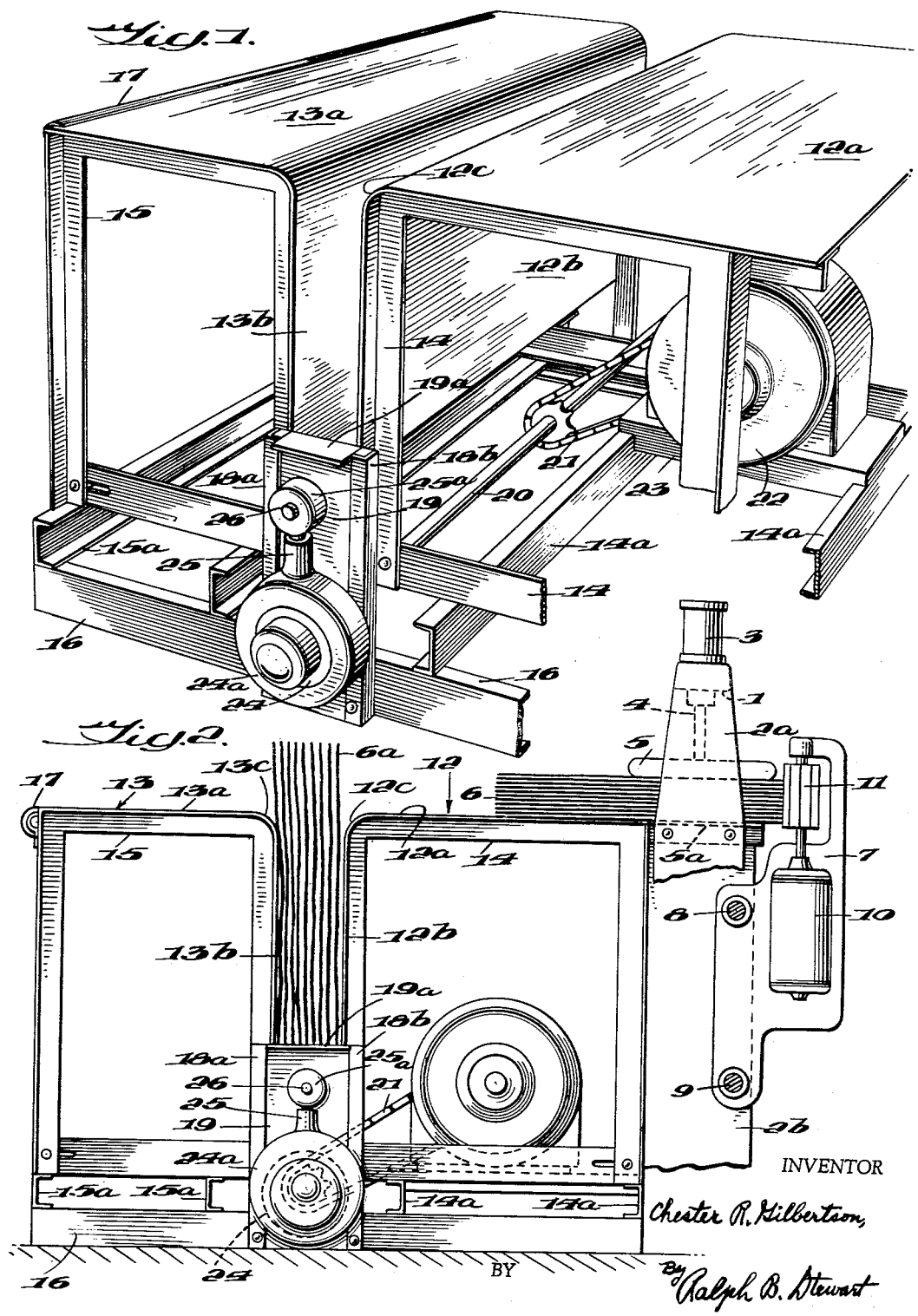
INVENTOR
Chester R. Gilbertson,
BY
Ralph B. Stewart
ATTORNEY United States Patent Office 2,712,840
Patented July 12, 1955

2,712,840

VENEER WORKING MACHINE

Chester R. Gilbertson, Bellingham, Wash., assignor to Mt. Baker Plywood, Inc., Bellingham, Wash., a corporation of Washington Application March 29, 1954, Serial No. 419,397

7 Claims. (Cl. 144—117)

This invention relates to a machine for operating upon thin sheets of veneer.

Sheets of veneer as normally manufactured have irregular edges and are not suited for edge gluing. Before such sheets can be used for edge gluing or for incorporation into laminated board of greater width than the veneer sheets, it is necessary to trim at least one edge of the sheet to a clean straight line or edge. It is impractical to trim each sheet individually, so it is customary to form a bundle of many sheets and to trim the edges of the sheets along one side of the bundle in a jointing machine. A satisfactory jointing operation with a minimum loss of veneer and time requires a shaking operation to arrange the sheets in the bundle so that the edges of the sheets along one side of the bundle are approximately in one plane.

My invention is concerned with a machine for trimming or jointing veneer sheets along one edge of a bundle, and a particular object of the invention is to devise a shaker for shaking the veneer preliminary to the trimming operation so that the edges of the veneer sheets on one side of the bundle are all in the same plane or substantially in the same plane.

My novel shaker comprises a table having the top divided into two spaced sections separated by a vertical slot. At the bottom of this slot in the table is arranged a vibratory support which supports a bundle of veneer sheets arranged in the slot, the sheets being in a vertical plane with their lower edges resting on the vibratory support. One half of the table is used as a support for transferring the bundle from a cart to the shaker slot, and the other half of the table acts as a support for the bundle while the edges of the bundle are being trimmed or jointed. A suitable clamp or press is provided to hold the bundle in a compressed stack during the trimming operation.

The rough veneer sheets are about eight feet long and may have a width of as much as two feet. A stack of these sheets is moved to the edge-trimming jointer on a cart. Two operators, one at each end of the cart, remove the veneer sheets from the cart in loose bundles from three to six inches thick and containing from twenty to fifty sheets of veneer. The operators must shake each bundle to insure approximate alignment of the edges of the sheets along one edge of the bundle in a common plane, and then the bundle is placed in the trimming or jointing machine with the aligned edges in position to be trimmed by the jointer head.

Another object of my invention is to devise a machine for facilitating the handling of the bundles of veneer sheets in moving the bundles from a cart into the shaker, and then moving the bundles from the shaker into the jointer. My machine is designed to reduce to a minimum the amount of lifting involved in the handling of the bundles and to reduce the amount of time required to shake the bundles. By the use of my machine, it is possible to perform the shaking operation in an interval of approximately five seconds.

My invention is illustrated in the accompanying drawing in which:

Figure 1 is a perspective view illustrating one form of shaker; and

Figure 2 is an end elevational view of Figure 1 and further showing the jointer or trimming machine associated with the shaker. The jointing machine has been omitted from Figure 1.

One suitable form of jointing machine is illustrated diagrammatically in Figure 2. It includes a press for clamping the stack of laminations during the jointing operation and comprising a horizontal beam 1 supported at the two ends by vertical frame members 2a and 2b, the lower section of member 2a being cut away to show the movable carriage for the driving motor and the cutter head. The beam 1 supports two or more hydraulic cylinders 3 mounted on the top side thereof. The piston in each cylinder is connected through rod 4 to a movable platen 5 which presses against the top of a stack of veneer sheets shown at 6. The stack is supported upon a fixed platen or table 5a, one edge of the stack projecting beyond the outer edge of the table 5a as shown in Figure 2.

A movable carriage 7 is mounted for movement parallel with beam 1 on a pair of horizontal rods 8 and 9 supported at their ends by frame members 2a and 2b. A suitable motor, such as electric motor 10, is mounted upon the carriage 7 and drives a rotary cutter 11 which is positioned to trim the edges of the veneer sheets along the projecting edge of the stack 6. The carriage 7 may be moved along the rods 8 and 9 in any suitable manner. One or both of the rods 8 and 9 may be mounted for rotation about their axes and have threaded engagement throughout their length with the carriage 7, whereby rotation of one or both rods will move the carriage lengthwise of the rods during the jointing operation.

The shaker section of my machine is shown in perspective in Figure 1 and is illustrated in end elevation to the left of the jointing machine in Figure 2. The shaker involves a table structure having two flat surfaces 12 and 13 arranged in the same horizontal plane as the platen 5a and being spaced apart to provide a slot for receiving a bundle of laminations shown in Figure 2 at 6a. The table section 12 may constitute a continuation of the table 5a of the jointing machine, or it may be formed separately but arranged adjacent the table 5a to constitute a continuation of the table 5a.

The table section 12 preferably is formed of a metal sheet supported upon two or more frames 14 arranged in spaced relation on a pair of joists or beams 14a. The table section 12 is formed of a horizontal portion 12a of the metal sheet, and the sheet extends downwardly into the slot between the two table sections and a vertical portion of the sheet 12b forms one wall of the slot. The metal sheet is rounded at the corners of the frames 14 as shown at 12c to prevent damage to the veneer sheets as they are inserted into the slot or removed therefrom.

Table section 13, like table section 12, is also formed of a metal sheet having a horizontal portion 13a mounted upon spaced frames 15, and a vertical portion 13b forming the other wall of the slot between the two table sections. The intermediate section 13c at the corners of the frames 15 is rounded to prevent injury to the veneer sheets as explained above. The spaced frames 15 are mounted upon a pair of joists or beams 15a. The beams 14a and 15a are supported upon a pair of cross-beams or sills 16 arranged at each end of the table and forming a common base for the two table sections. The vertical wall sections 12b and 13b form a pocket between the two table sections for receiving a bundle of veneer sheets 6a (Figure 2) with their planes arranged vertically.

A cylindrical roller 17 is mounted on the cart side of the table at the upper outer edge thereof and providing a rolling surface over which the bundle may be transferred from the cart to table section 13 without danger of being damaged by the edge of the table. Roller 17 is journalled in bearings at the ends of the table section 13.

As shown in Figure 2, the vibratory support for a bundle of veneer sheets shown at 6a comprises a pair of sliding blocks 19 arranged at opposite ends of the table and near the bottom of the slot between the wall sections 12b and 13b. The blocks 19 are supported for vertical reciprocation between a pair of vertical guides 18a and 18b which are secured at their lower ends to cross-beams 16. A flat bearing plate 19a may be carried at the upper end of each sliding block to provide two flat horizontal surfaces for supporting the bundle of veneer sheets within the table slot.

The blocks 19 are reciprocated vertically by means of a rotary shaft 20 mounted in suitable bearings not shown but located below the blocks 19, the shaft having suitable connections from its outer ends to reciprocate the blocks 19. The shaft 20 may be driven by a chain or belt drive 21 from a suitable driving motor 22 mounted upon a base 23 supported on beams 14a, 14a. The driving connections between the ends of shaft 20 and blocks 19 are alike and each involves an eccentric 24 secured to the end of the shaft and having a strap 24a connected to the block 19 through a pitman arm 25 having a head 25a pivotally connected to the block 19 by means of a pin 26 secured to the block and extending through a transverse bore formed in the head 25a. By this arrangement, rotation of the shaft 20 produces periodic vertical reciprocation of the blocks 19, thereby subjecting the bundle of veneer sheets 6a to a shaking operation. The shaft 20 may be rotated at a speed of the order of 1800 R. P. M., or at any other suitable speed.

I claim:

1. A veneer working machine comprising a table having the top surface thereof divided in two spaced sections separated by a vertical slot, a vertically movable support mounted below the top of said table and in a position to support a bundle of veneer sheets within said slot, means for subjecting said support to periodic vibratory movement vertically, means for clamping a bundle of veneer sheets to one section of said table top with the edge of said bundle projecting over the outer edge of said one section, a trimming device having a rotary cutter head for trimming the projecting edges of the veneer sheets, and means for mounting said trimming device for movement parallel with the projecting edge of said bundle.

2. A veneer working machine according to claim 1 and including a roller mounted adjacent the outer edge of the other top section of said table to provide a rolling surface over which a bundle of veneer sheets may be moved onto said other top section.

3. A veneer working machine according to claim 1 wherein each top section of said table is formed of a metal sheet having a horizontal portion forming the top surface of the table section and a vertical portion forming one wall of said vertical slot, and an intermediate rounded portion connecting said horizontal and vertical portions at the upper edge of said slot.

4. A veneer working machine comprising a table having the top surface thereof divided in two spaced sections separated by a vertical slot, a vertically movable support mounted below the top of said table and in a position to support a bundle of veneer sheets within said slot with their planes arranged vertically, and means for subjecting said support to periodic vibratory movement vertically.

5. A veneer working machine according to claim 4 and including a roller mounted adjacent the outer edge of one of the top sections of said table to provide a rolling surface over which a bundle of veneer sheets may be moved onto said top section.

6. A veneer working machine according to claim 4 wherein each top section of said table is formed of a metal sheet having a horizontal portion forming the top surface of the table section and a vertical portion forming one wall of said vertical slot, and an intermediate rounded portion connecting said horizontal and vertical portions at the upper edge of said slot.

7. A veneer working machine comprising means providing two horizontal table surfaces arranged in a common plane and having their adjacent edges spaced apart to provide an opening between them, means forming a pocket below said opening for receiving a bundle of veneer sheets with their planes arranged vertically, a vertically movable support mounted adjacent the bottom of said pocket in a position to support said bundle of veneer sheets within said pocket, and means for subjecting said support to periodic vibratory movement vertically.

References Cited in the file of this patent

UNITED STATES PATENTS

| | | |
|---|---|---|
| 534,661 | Parmelee et al. | Feb. 26, 1895 |
| 1,853,554 | Dennis | Apr. 12, 1939 |
| 2,494,075 | Weyandt | Jan. 10, 1950 |
| 2,624,577 | Pengnet | Jan. 6, 1953 |